(12) United States Patent
Mori

(10) Patent No.: US 8,867,066 B2
(45) Date of Patent: Oct. 21, 2014

(54) PRINT PROCESSING APPARATUS AND CONTROL METHOD

(75) Inventor: Hiroshi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 12/789,448

(22) Filed: May 27, 2010

(65) Prior Publication Data

US 2010/0328716 A1 Dec. 30, 2010

(30) Foreign Application Priority Data

Jun. 26, 2009 (JP) ................................. 2009-152874

(51) Int. Cl.
*G06F 3/12* (2006.01)
(52) U.S. Cl.
CPC ............ *G06F 3/1285* (2013.01); *G06F 3/1208* (2013.01); *G06F 3/1256* (2013.01)
USPC ......... 358/1.15; 358/1.13; 358/1.18; 715/274
(58) Field of Classification Search
CPC ... G06F 3/1256; G06F 3/1208; G06F 17/212; H04N 1/044
USPC .................. 358/1.15, 1.13; 715/274
See application file for complete search history.

(56) References Cited

U.S. PATENT DOCUMENTS

| 2006/0023240 | A1 | 2/2006 | Natori |
| 2006/0066899 | A1* | 3/2006 | Yoshida ........................ 358/1.15 |
| 2008/0068629 | A1* | 3/2008 | Oyanagi et al. ................ 358/1.9 |
| 2008/0134027 | A1* | 6/2008 | Saeki et al. ..................... 715/274 |
| 2010/0053709 | A1* | 3/2010 | Minami et al. ................ 358/518 |
| 2010/0073706 | A1* | 3/2010 | Chan ............................ 358/1.15 |

FOREIGN PATENT DOCUMENTS

JP 2006-39941 2/2006

* cited by examiner

*Primary Examiner* — Marivelisse Santiago Cordero
*Assistant Examiner* — Kent Yip
(74) *Attorney, Agent, or Firm* — Fitzpatrick, Cella, Harper & Scinto

(57) ABSTRACT

A print processing apparatus comprises the image processing unit including a plurality of image processing sections that correspond respectively to the plurality of kinds of image processes; a generation unit configured to generate a preview image based on a result of processing by the image processing unit; a display unit configured to display the preview image generated by the generation unit; a use-situation identification unit configured to identify a use situation of the image processing sections; and a selection unit configured to select a preview method from among a plurality of preview methods for generating the preview image, according to the use situation identified by the use-situation identification unit, the selected preview method using an image processing section that is available in the identified use situation of the image processing section.

12 Claims, 12 Drawing Sheets

FIG. 1
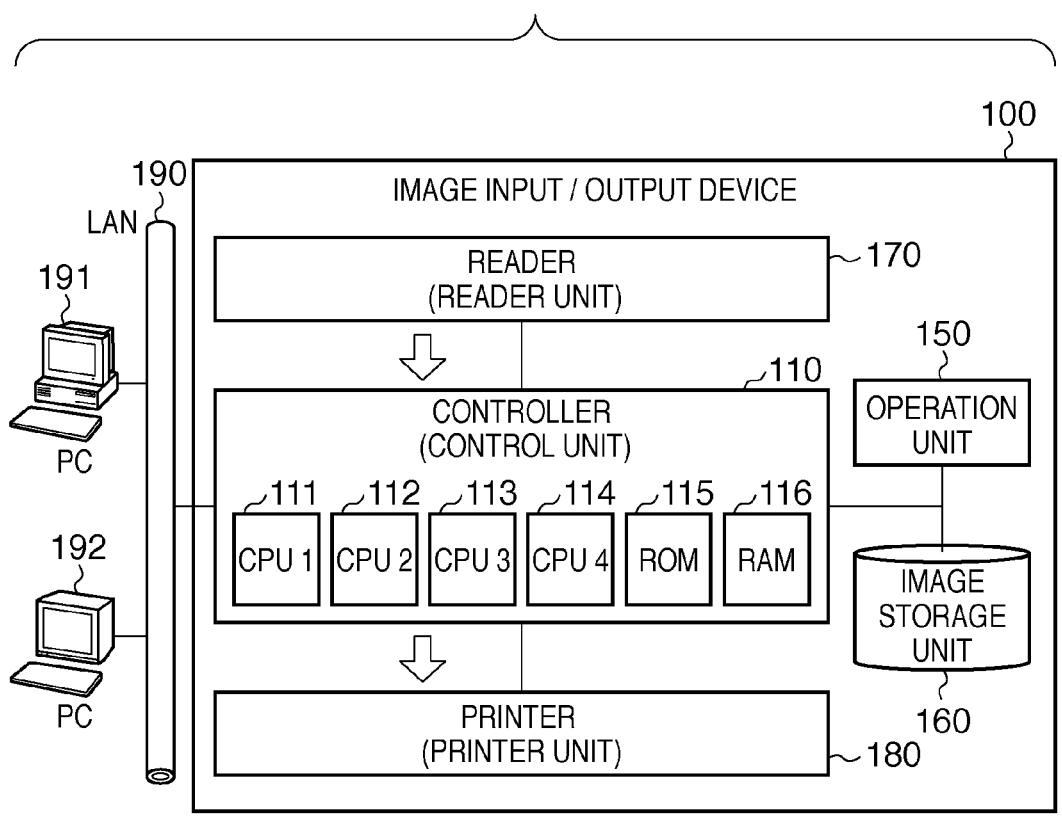
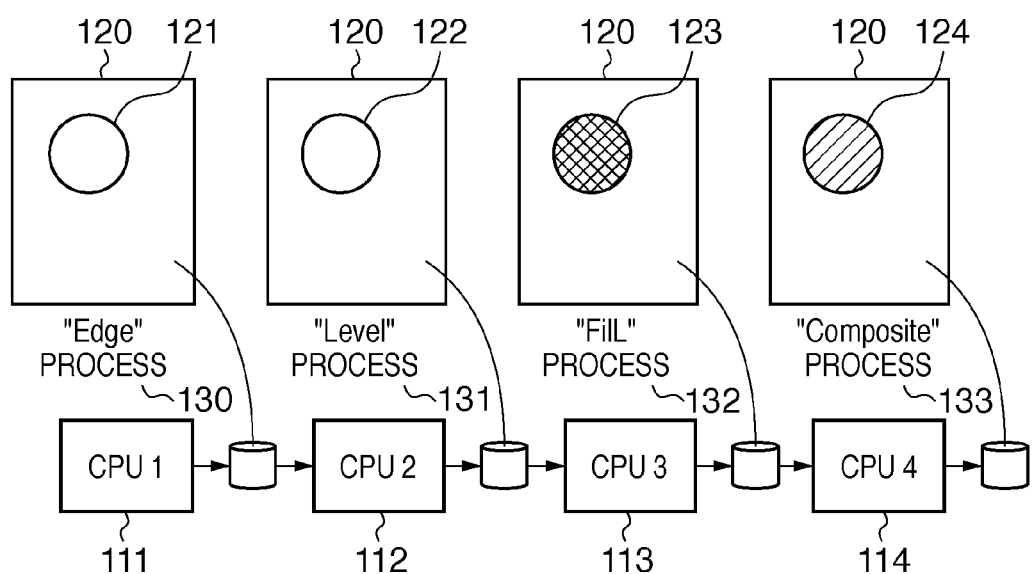

FIG. 3

| 7 | 6 | 5 | 4 | 3 | 2 | 1 | 0 |
|---|---|---|---|---|---|---|---|
| Reserved | | | | CPU 4_used_Flag | CPU 3_used_Flag | CPU 2_used_Flag | CPU 1_used_Flag |

CONFLICT INFORMATION [7:0] — 300

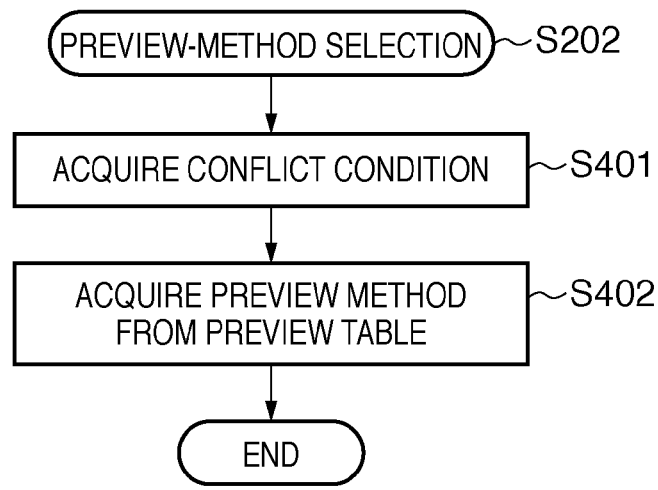

PREVIEW-METHOD SELECTION — S202

ACQUIRE CONFLICT CONDITION — S401

ACQUIRE PREVIEW METHOD FROM PREVIEW TABLE — S402

END

FIG. 5

| PREVIEW TABLE 500 | |
|---|---|
| CONFLICT INFORMATION [7:0] 300 | PREVIEW METHOD 501 |
| 0 | Normal PREVIEW |
| 1 | Top Level PREVIEW |
| 2 | Top Level PREVIEW |
| 3 | Attribute PREVIEW |
| 4 | Top Level PREVIEW |
| 5 | Attribute PREVIEW |
| 6 | Attribute PREVIEW |
| 7 | Edge PREVIEW |
| ...... | |
| 11 | Thumbnail PREVIEW |
| 12 | Attribute PREVIEW |
| 13 | Edge PREVIEW |
| 14 | Edge PREVIEW |
| 15 | WAITING FOR CANCELLATION OF CONFLICTS |

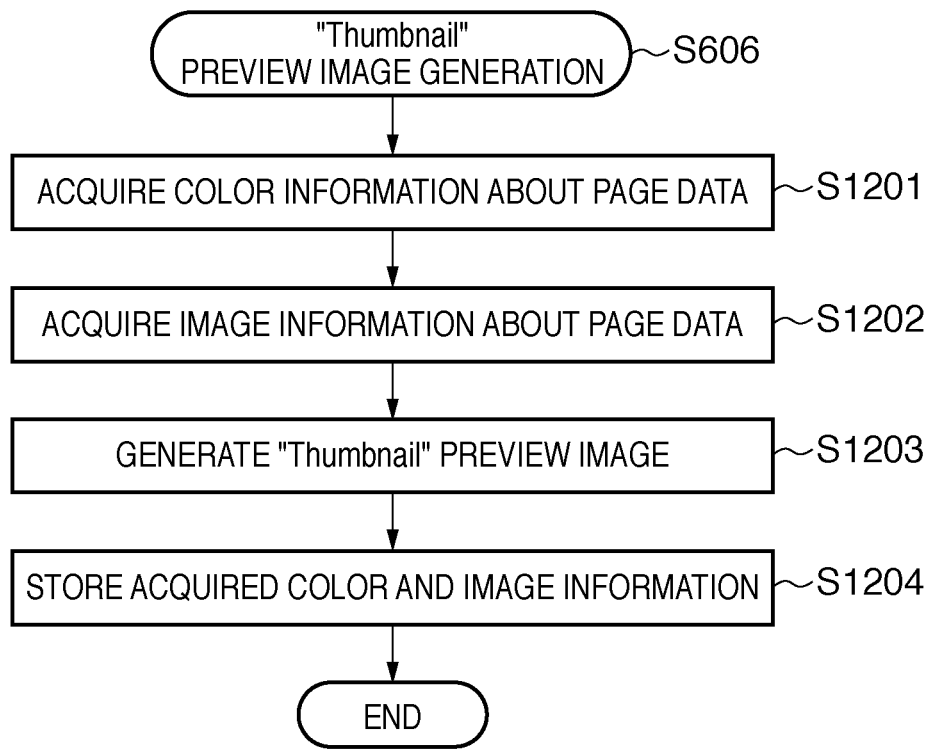
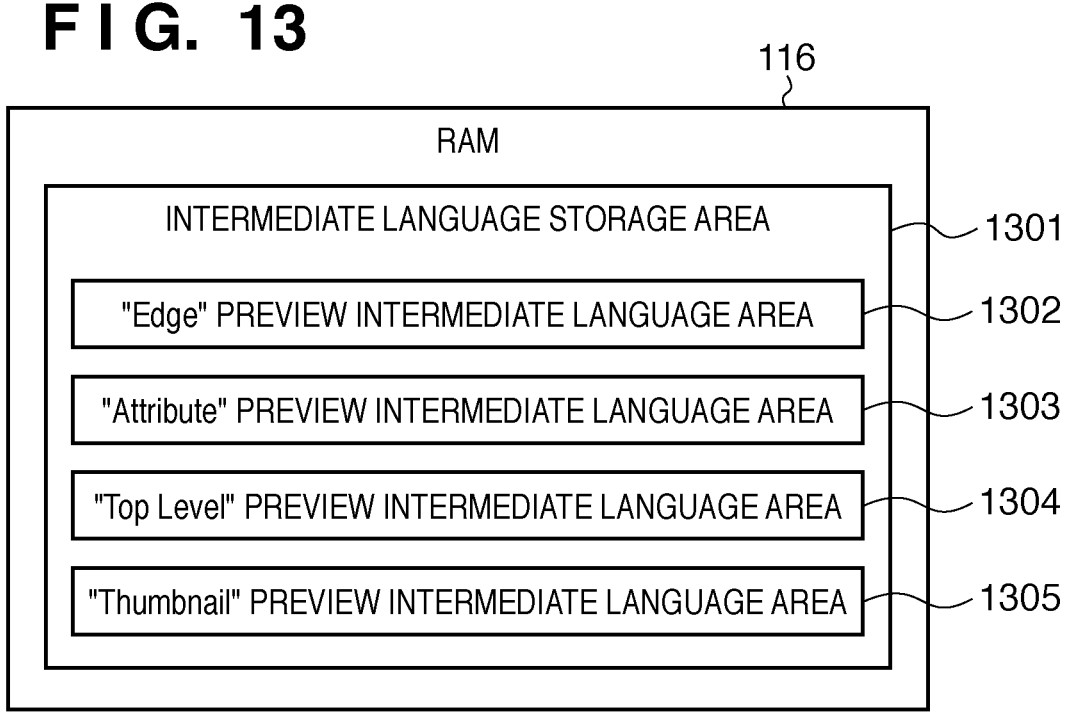

PRINT PROCESSING APPARATUS AND CONTROL METHOD

BACKGROUND OF THE INVENTION

1. Field of the Invention

The present invention relates to a print processing apparatus and a control method. Specifically, the invention relates to so-called preview processing, in which output results of print data are previewed prior to printing.

2. Description of the Related Art

When printing data such as documents or images with printing apparatuses such as printers, the use of print preview functions that display to-be-printed images on the screen for users in advance of actual printing on paper is conventionally well known. Using the print preview functions to preview images to be printed, users are able to confirm the suitability of output results, such as whether images are in the desired layouts. The print preview functions can be used not only at the time of actual printing but also at the time of retrieving desired print data from print data recorded on recording media such as HDDs in printers.

Examples of preview processing methods include a method for displaying a thumbnail image that corresponds to the print data and a method for generating a preview image from the print data at the time of specifying printing and displaying the generated image, for example. As a processing method used when a conflict occurs between print processing and preview processing, Japanese Patent Laid-Open No. 2006-039941 proposes a method for controlling conflicts between print processing and preview processing based on preview settings in a job.

However, the above-described conventional technique does not allow simultaneous execution of both print processing and preview processing when they use the same resources. For example, preview processing cannot be completed during execution of print processing, which leads to a lack of user-friendly immediacy.

SUMMARY OF THE INVENTION

The present invention has been made in view of the aforementioned problem that arises when resource conflicts occur between print processing and preview processing, and provides a preview function that achieves user-friendly immediacy at the time of conflicts by effective use of available resources.

According to one aspect of the present invention, there is provided a print processing apparatus comprising: an image processing unit configured to perform a plurality of kinds of image processes on an object to be drawn included in print data, the image processing unit including a plurality of image processing sections that correspond respectively to the plurality of kinds of image processes; a generation unit configured to generate a preview image based on a result of processing by the image processing unit; a display unit configured to display the preview image generated by the generation unit; a use-situation identification unit configured to identify a use situation of the image processing sections; and a selection unit configured to select a preview method from among a plurality of preview methods for generating the preview image, according to the use situation identified by the use-situation identification unit, the selected preview method using an image processing section that is available in the identified use situation of the image processing section; wherein the generation unit is configured to generate intermediate data for generating the preview image, using a result of processing by an image processing section that corresponds to the preview method selected by the selection unit, and generates the preview image using the generated intermediate data.

According to one aspect of the present invention, there is provided a control method for a print processing apparatus that comprises an image processing unit that is configured to perform a plurality of kinds of image processes on an object to be drawn that is included in print data, the image processing unit including a plurality of image processing sections that correspond to the plurality of kinds of image processes, the method comprising: a use-situation identification step of identifying a use situation of the image processing sections; a selection step of selecting a preview method from among a plurality of preview methods for generating the preview image, according to the use situation identified in the use-situation identification step, the selected preview method using an image processing section that is available in the identified use situation of the image processing sections; an intermediate-data generation step of generating intermediate data for generating the preview image, using a result of processing by an image processing section that corresponds to the preview method selected in the selection step; and a preview-image generation step of generating the preview image, using the intermediate data generated in the intermediate-data generation step.

The present invention allows implementation of user-friendly previews with high immediacy by effective use of available resources even in cases of limited resource conditions at the time of resource conflicts.

Further features of the present invention will become apparent from the following description of exemplary embodiments (with reference to the attached drawings).

BRIEF DESCRIPTION OF THE DRAWINGS

FIG. 1 is a block diagram illustrating an example configuration of a print processing system according to an embodiment of the present invention.

FIG. 3 illustrates a data format of conflict information according to the embodiment.

FIG. 4 is a flowchart showing details of a preview-method selection process according to the embodiment.

FIG. 5 illustrates an example of a preview table used in the preview-method selection process according to the embodiment.

FIG. 12 is a flowchart showing a "Thumbnail" preview method selection process according to the embodiment.

FIG. 13 illustrates an example internal configuration of a RAM according to the embodiment.

DESCRIPTION OF THE EMBODIMENTS

Figure 2:
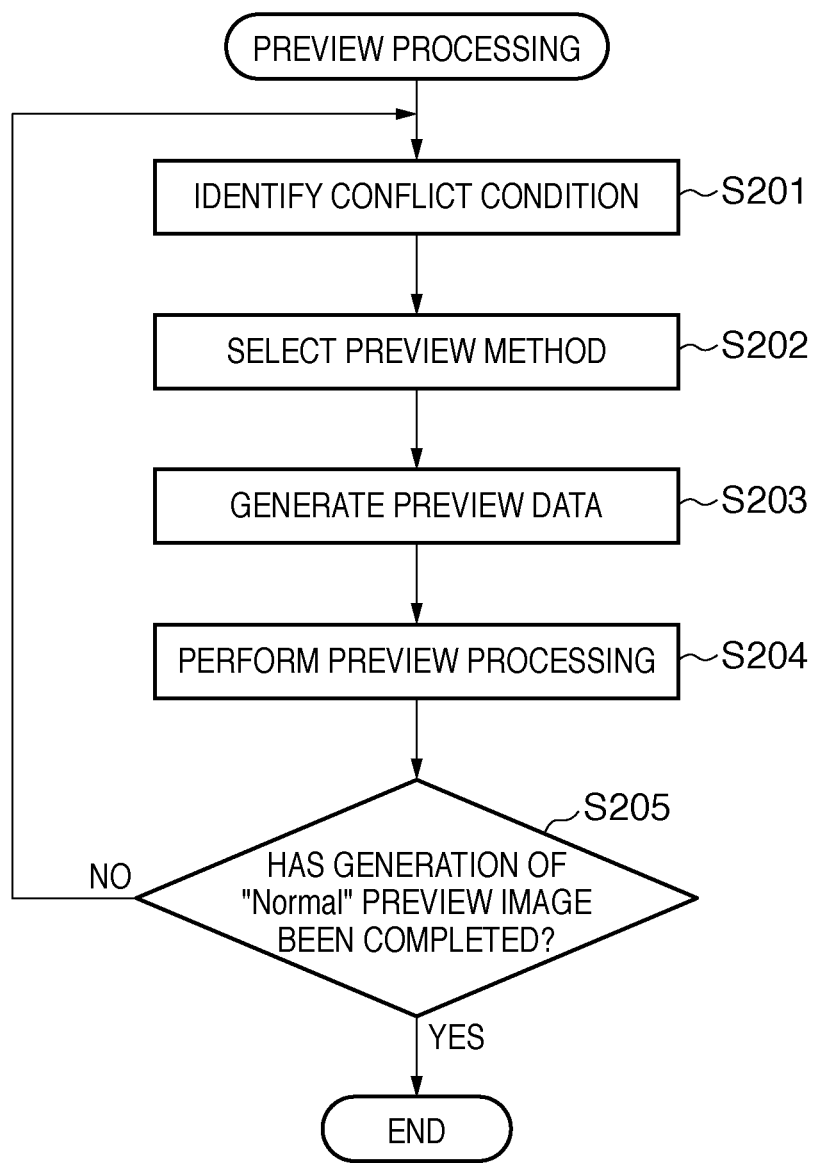
FIG. 2 is a flowchart showing a procedure of preview processing in a print processing apparatus according to the embodiment.

Hereinafter, embodiments of the present invention will be described with reference to the drawings. In the embodiments of the present invention, MFPs (Multi-Function Printers) such as an image input/output device 100 are used as print processing apparatuses by way of example. It is, of course, to be understood that the present invention is not limited thereto and other printers such as SFPs (single Function Printers) or LBPs (Laser Beam Printers) may be used.

First Embodiment

FIG. 1 is a block diagram illustrating an embodiment of an input/output device relating to the present invention, the device being equipped with a controller as an electronic component. An image input/output device 100 is connected to host computers (in the present embodiment, a first host computer 191 and a second host computer 192) on a LAN (Local Area Network) 190 such as an Ethernet® network.

The image input/output device 100 includes a reader (reader unit) 170, a printer (printer unit) 180, an operation unit 150, an image storage unit 160, and further a controller (controller unit) 110 that controls the above components. The controller 110 includes, for example, CPUs 1 to 4, a ROM, and a RAM and centrally controls the whole image input/output device 100 with the CPUs 1 to 4 operating based on programs stored in the ROM or other storage media. An example configuration of the present embodiment is that predetermined programs for image generation processing are loaded into the CPUs 1 to 4. Image generation processing is implemented by sequentially performing an "Edge" process 130 of generating a outline image 121 of an object included in page data 120, a "Level" process 131 of determining superposition and the type of an object 122, a "Fill" process 132 of drawing an object 123 according to predetermined fill-in information, and a "Composite" process 133 of superimposing an object 124 by predetermined superposition processing.

Thus, in this configuration, a program for the "Edge" process 130 is loaded into the CPU 1. A program for the "Level" process 131 is loaded into the CPU 2. A program for the "Fill" process 132 is loaded into the CPU 3. Last, a program for the "Composite" process 133 is loaded into the CPU 4, and those processes are performed sequentially by the CPU 1, the CPU 2, the CPU 3, and the CPU 4, in that order, thus implementing image generation. Note that the RAM is used as a work area of the CPUs. The reader 170 reads image data. The printer 180 outputs image data. The operation unit 150 includes a keyboard for use in input and output operations of image data, and a liquid crystal panel is used to, for example, display and enter settings for image data or various functions. The image storage unit 160 is capable of loading and storing print data such as image data or printer control languages (e.g., ESC codes or PDLs (Page Description Languages)). For example, image data that has been read by controlling the reader 170, PDLs that have been received from the host computers 191 and 192 via the LAN 190, or image data generated from such PDLs can be loaded and/or stored. Exemplifying a printing system with the above-described configuration, a concrete embodiment of the present invention will be described below.

Procedure of Preview Processing

FIG. 2 is a flowchart showing a procedure of preview processing in the image input/output device 100 according to the present embodiment. FIG. 3 illustrates a data format of conflict information used in the present embodiment. Hereinafter, the letter S (step) is appended to numbers that indicate process steps.

In S201, the image input/output device 100 first identifies what conflict conditions resources are in. For example, using the functions of the OS, it is identified in the present embodiment whether or not the CPUs 1 to 4 are used for other processes. Then, conflict information 300 is generated based on the identified conflict conditions. The conflict information 300 is, for example, prepared as a 1-byte variable that indicates a set of flag information pieces in the present embodiment, and in cases where the CPU 1 (111) is being used, a value 1 is assigned to a CPU 1_used_flag 301. If the CPU 1 is not used, a value 0 is assigned. Similarly, if the CPU 2 (112) is being used, a value 1 is assigned to a CPU 2_used_flag 302. If the CPU 2 is not used, a value 0 is assigned. If the CPU 3 (113) is being used, a value 1 is assigned to a CPU 3_used_flag 303. If the CPU 3 is not used, a value 0 is assigned. If the CPU 4 (114) is being used, a value 1 is assigned to a CPU 4_used_flag 304. If the CPU 4 is not used, a value 0 is assigned. Note that a reserved area 305 is not defined in the present example. The conflict information 300 allows users to grasp conflict conditions of common resources, that is, the CPUs.

Then, in S202, a processable preview method is selected based on the value of the conflict information 300 generated in S201. The details of the selection process will be described later with reference to the flowchart in FIG. 4 and with the preview table in FIG. 5. In S203, a preview image that corresponds to the preview method selected in S202 is generated. The details of the generation process will be described later with reference to the flowchart in FIG. 6. In S204, the preview image generated in S203 is displayed on a display medium in the operation unit 150, such as a liquid crystal panel. In S205, whether or not the preview-image generation and display processes have been completed is determined. The criterion of the completion is whether or not an image to be displayed after a "Normal" preview process is faithfully displayed. Specifically, the above-described procedure is repeated until an image to be displayed as a "Normal" preview is generated. During repetitions of processing, if a change occurs in the conflict conditions of the common resources in S201, the change is detected and another preview method is reselected in S202.

Accordingly, preview processing is performed by executing the steps S201 to S204 once, and a preview image that can be generated at that time is displayed. Then, if the preview-image generation processing is determined as having not yet been completed in S205, the processing returns to the conflict-condition identification in S201 in order to repeat preview processing. In the present embodiment, regardless of the values of the conflict information that have been obtained by the conflict-condition identification in S201, a "Normal" preview is reselected when the preview-method selection is performed for the second time in S202. Then, as illustrated in the procedure in FIG. 8, already-generated intermediate data is used to generate new intermediate data, which is used to generate a "Normal" preview.

Preview-Method Selection Process

FIG. 4 is a flowchart showing the details of the preview-method selection process in S202 of FIG. 2 according to the present embodiment. FIG. 5 illustrates details of a preview table 500 used in the preview-method selection process in S202. Note that the preview table 500 implements a preview-method holding unit.

In S401, the value of the conflict information 300 generated in S201, indicating conflict conditions, is acquired. The conflict information 300 includes information about each CPU, and in the present embodiment, it is represented by 4 bits in the binary system, the bits indicating the flags of the four CPUs. Note that, in the data format of the conflict information illustrated in FIG. 3, a maximum of 8 bits of flags (8 CPUs) are storable.

In S402, a preview method is selected from the preview table 500 based on the acquired value of the conflict information 300. Practically, as illustrated in FIG. 5, the preview table 500 is in such a format that defines preview processes to be performed according to the value of the conflict information 300. Specifically, the preview table 500 stores preview information that associates conflict conditions of common resources indicated by the conflict information with preview methods implementable in those conflict conditions. In the present embodiment, the conflict information indicates a 4-bit value ranging from 0 to 15. Thus, a preview process is selected using the value of the conflict information 300 as a key.

One example of the selection process is shown. For example, in a case where the conflict information 300 is 0, the CPU 1_used_flag 301 is 0, the CPU 2_used_flag 302 is 0, the CPU 3_used_flag 303 is 0, and the CPU 4_used_flag 304 is 0. This indicates that all CPUs are available. Accordingly, a usual "Normal" preview described later is selected. In a case where the conflict information 300 is 1, the CPU 1_used_flag 301 is 1, the CPU 2_used_flag 302 is 0, the CPU 3_used_flag 303 is 0, and the CPU 4_used_flag 304 is 0. This indicates that the CPU 1 is not available. In this case, the "Edge" process, which is an initial process for image generation, is disabled. However, since it is clear from the conflict information 300 that the CPUs 2, 3, and 4 are available, the preview processing can be continued as far as possible using the CPUs other than the CPU 1. In this case, a program for the "Edge" process 130 is loaded into the CPU 2. Also, a program for the "Level" process 131 is loaded into the CPU 3.

Last, a program for the "Fill" process 132 is loaded into the CPU 4, and a selection is made so as to preview a top-level preview image described later. A similar selection process is performed in cases where the conflict information 300 is 2, 4, or 8 since the number of conflicting CPUs is the same. In other words, the values 2, 4, and 8 indicate respectively that the CPUs 2, 3, and 4 are being used. In a case where the conflict information 300 is 3, the CPU 1_used_flag 301 is 1, the CPU 2_used_flag 302 is 1, the CPU 3_used_flag 303 is 0, and the CPU 4_used_flag 304 is 0. This indicates that the CPUs 1 and 2 are being used for different processes and thus are not available. In this case, the initial "Edge" process and the second "Level" process for image generation are disabled. However, the CPUs 3 and 4 are available, and the preview processing can be continued as far as possible. Thus, in this case, a program for the "Edge" process 130 is loaded into the CPU 3. Also, a program for the "Level" process 131 is loaded into the CPU 4, and a selection is made so as to preview an "Attribute" preview image described later.

A similar selection process is performed in cases where the conflict information 300 is 5, 6, 9, 10, or 12 since the number of conflicting CPUs are the same. In a case where the conflict information 300 is 7, the CPU 1_used_flag 301 is 1, the CPU 2_used_flag 302 is 1, the CPU 3_used_flag 303 is 1, and the CPU 4_used_flag 304 is 0. This indicates that the CPUs 1, 2, and 3 are not available. In this case, the initial "Edge" process, the second "Level" process, and the third "Fill" process for image generation are disabled. However, the CPU 4 is available, and the preview processing can be continued as far as possible. Thus, in this case, a program for the "Edge" process 130 is loaded into the CPU 4, and a selection is made so as to preview an "Edge" preview image described later. A similar selection process is also performed in cases where the conflict information 300 is 13 or 14 since the number of conflicting CPUs is the same. In a case where the conflict information 300 is 11, the CPU 1_used_flag 301 is 1, the CPU 2_used_flag 302 is 1, the CPU 3_used_flag 303 is 0, and the CPU 4_used_flag 304 is 1. This indicates that the CPUs 1, 2, and 4 are not available. In this case, the initial "Edge" process, the second "Level" process, and the fourth "Composite" process for image generation are disabled. However, the CPU 3 is available, and the preview processing can be continued as far as possible.

In this case, an "Edge" preview image as described above may be previewed by loading a program for the "Edge" process 130 into the CPU 3. However, if the CPU 3 is configured as a dedicated circuit for performing, for example, the "Fill" process at high speed, it can be that the "Fill" process is performed at high speed so as to give a preview with higher immediacy than previewing an "Edge" preview image. Thus, in this case, a program for the "Fill" process 132 is loaded into the CPU 3, and a selection is made so as to preview an exceptional "Thumbnail" preview image that is implemented in a different sequence from that of the above-described preview image generation processing. Details of the preview of a "Thumbnail" preview image will be described later. Last, in a case where the conflict information 300 is 15, the CPU 1_used_flag 301 is 1, the CPU 2_used_flag 302 is 1, the CPU 3_used_flag 303 is 1, and the CPU 4_used_flag 304 is 1. This indicates that none of the CPUs 1, 2, 3, and 4 are available. In this case, since all of the processes are disabled, the processing waits until the conflict information 300 changes.

Preview Data Generation Process

Figure 6:
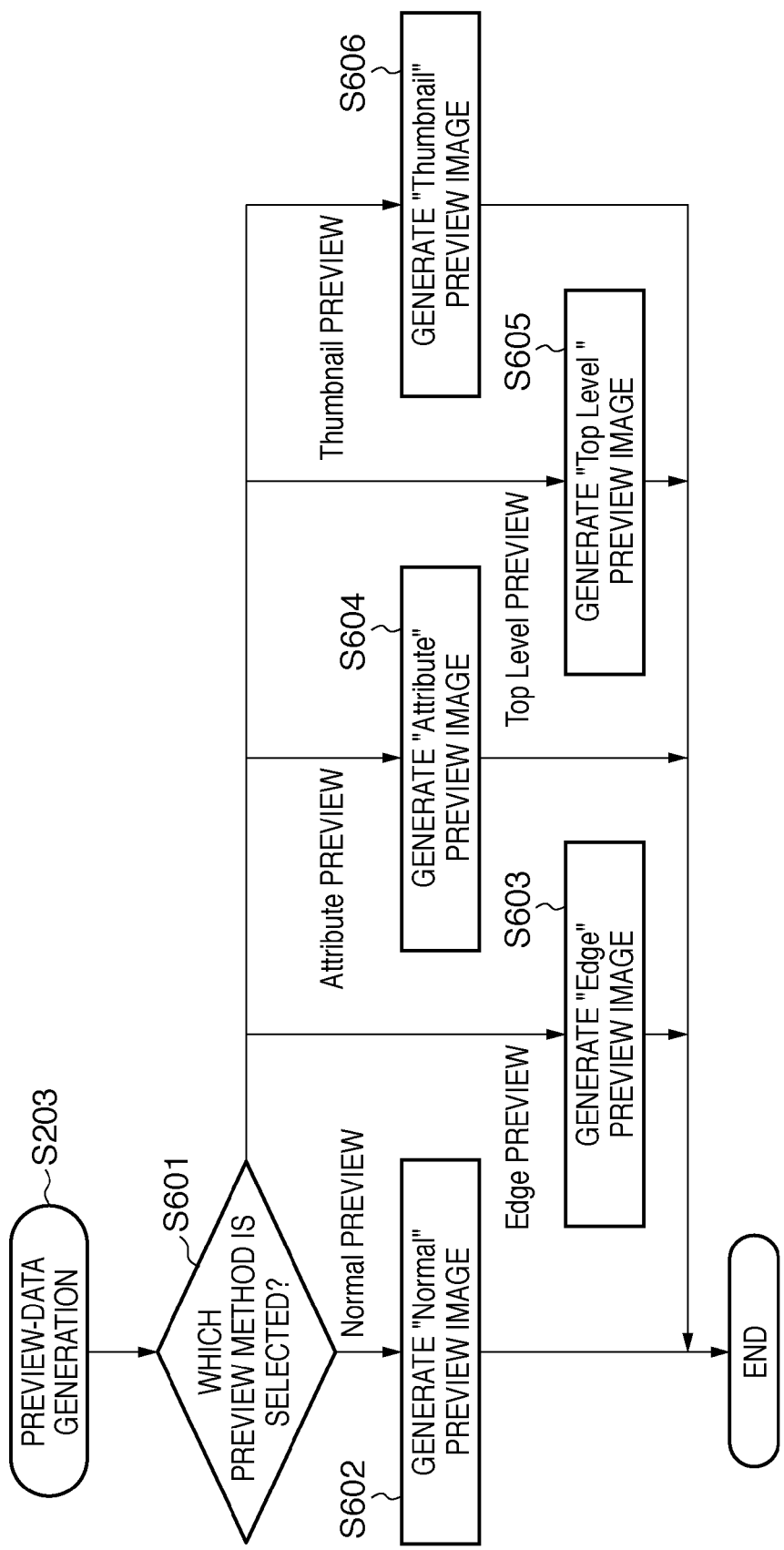
FIG. 6 is a flowchart showing a procedure of a process of generating preview data according to the embodiment.
Figure 7:
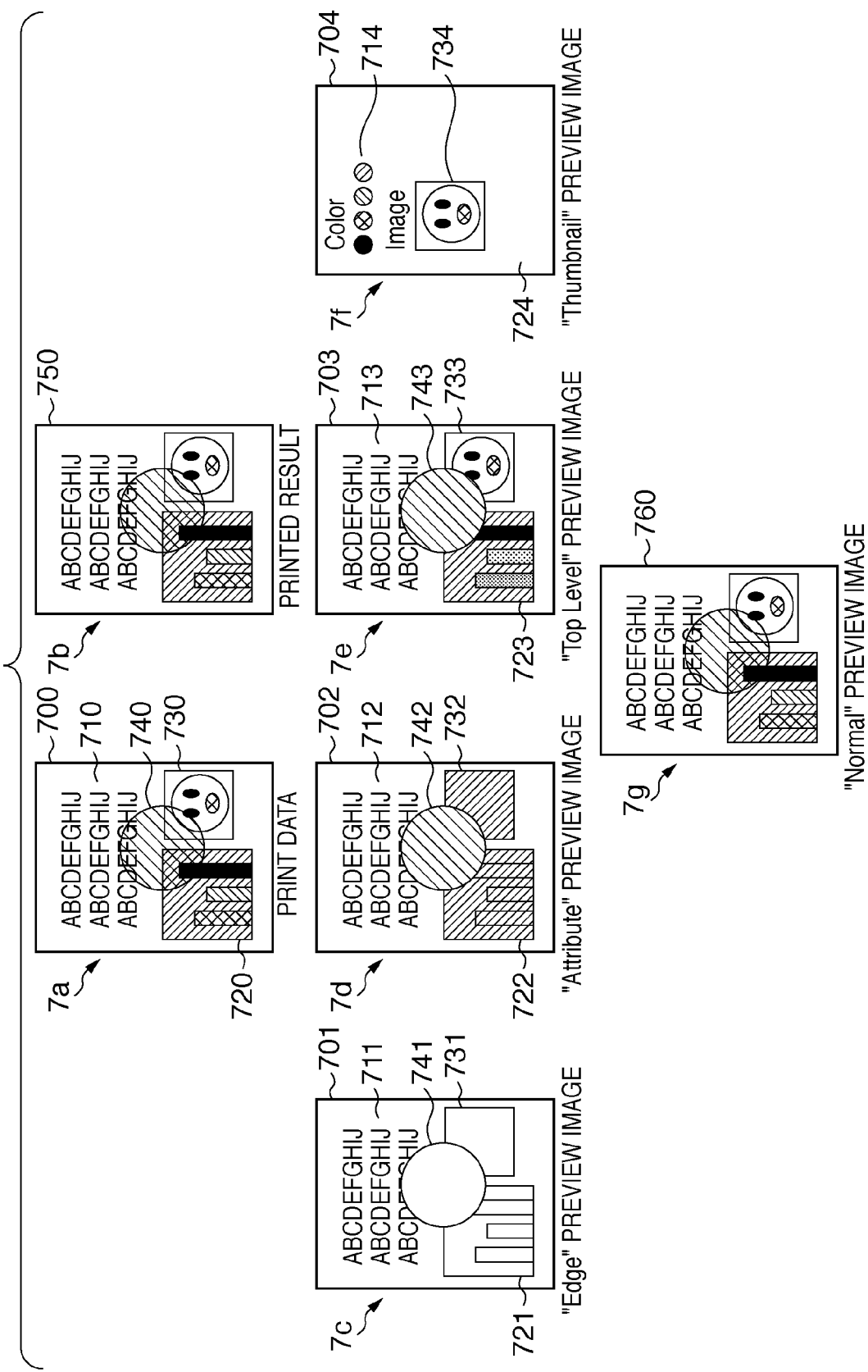
FIG. 7 illustrates overviews of preview images generated by preview methods according to the embodiment.

FIG. 6 is a flowchart showing the details of the preview data generation process in S203 of FIG. 2 according to the present embodiment. FIG. 7 illustrates multiple preview methods and overviews of preview images generated by the preview methods according to the present embodiment.

In S601, it is identified which preview method has been selected in the preview-method selection process in S202. If the selected preview method is a "Normal" preview method, the processing proceeds to S602. If the selected preview method is an "Edge" preview method, the processing proceeds to S603. If the selected preview method is an "Attribute" preview method, the processing proceeds to S604. If the selected preview method is a "Top Level" preview method, the processing proceeds to S605. If the selected preview method is a "Thumbnail" preview method, the processing proceeds to S606. In S602, a "Normal" preview image is generated. A "Normal" preview image 760 of 7g in FIG. 7 is a preview image that is comparable to the printed result 750 of 7b in FIG. 7 and that enables users to confirm the details of the printed result. That is, the preview image faithfully represents the printed result in 7b in FIG. 7. In other words, it is a preview image that that will be generated when all the CPUs illustrated in FIG. 1 have performed their processes. Outputs obtained by performing the same image processing as performed on print data are displayed as a preview image.

In S603, an "Edge" preview image is generated. "Edge" preview images are preview images that are obtained by drawing only the outlines of objects to be drawn as indicated by 701, 711, 721, 731, and 741 of 7c in FIG. 7. An edge preview image 701 is represented by the outline of a character 711, the outline of an image 731, and the outlines of graphics 721 and 741. A comparison of the "Edge" preview image 701 of 7c in FIG. 7 and the printed result 750 of 7b in FIG. 7 shows differences in transparent processing, color, and the contents of the images. However, defining the outlines of objects to be drawn allows users to preview an overview of the printed result 750, such as what is drawn at what position.

In S604, an "Attribute" preview image is generated. "Attribute" preview images are preview images in which objects to be drawn are drawn with outlines and filled in according to their attribute information (e.g., types) as indicated by 702, 712, 722, 732, and 742 of 7*d* in FIG. 7. At this point of processing, composite processing by means of ROP or transparent processing is disregarded, and each object to be drawn is drawn over another in the order specified by the print data. Here, what colors are used to fill in areas that have different attribute information is preset. For example, presetting is made such that black is used for characters, green for images, and red for graphics. An "Attribute" preview image 702 is represented by characters 712, graphics 722 and 742, and an image 732 that is filled in with green. A comparison of the "Attribute" preview image 702 and the printed result 750 shows differences in transparent processing and the contents of the images. However, since characters and graphics are filled in with colors specified by print data, the "Attribute" preview image 702 is closer to the printed result 750 than the "Edge" preview image 701. In S605, a "Top Level" preview is generated. "Top Level" preview images are preview images in which objects to be drawn are filled in according to the specification of the print data as indicated by 703, 713, 723, 733, and 743 of 7*e* in FIG. 7. Also at this point of processing, composite processing by means of ROP or transparent processing is disregarded, and an image is obtained by drawing each area over another in the order specified by print data.

A "Top Level" preview image 703 as shown in 7*e* in FIG. 7 is represented by characters 713, graphics 723 and 743, and an image 733. There are some areas that are not displayed due to the presence of the graphic 743. However, the "Top Level" preview image 703 allows users to confirm the colors of characters and graphics and the contents of images and is thus closer to the printed result 750 of 7*b* in FIG. 7 than the "Edge" preview image 701 and the "Attribute" preview image 702. In S606, a "Thumbnail" preview image is generated. "Thumbnail" preview images are images that provide thumbnail displays of color information and image data according to the specification of print data, as indicated by 704, 714, and 734 of 7*f* in FIG. 7. A "Thumbnail" preview image 704 is represented by characters, graphic color information 714, and an image 734. This allows users to confirm color information about characters and graphic to be used and the contents of images, and in particular as to images, it is capable of providing an appearance that is close to that in the printed result 750 of 7*b* in FIG. 7.

Note that, while the present embodiment provides five examples of preview images (the "Edge" preview image, the "Attribute" preview image, the "Top Level" preview image, the "Thumbnail" preview image, and the "Normal" preview image), the present invention is not limited thereto and may additionally include other preview images. Alternatively, any of the above-described preview images may be omitted depending on the functions of the apparatus.

Normal Preview Image Generation Process

Figure 8:
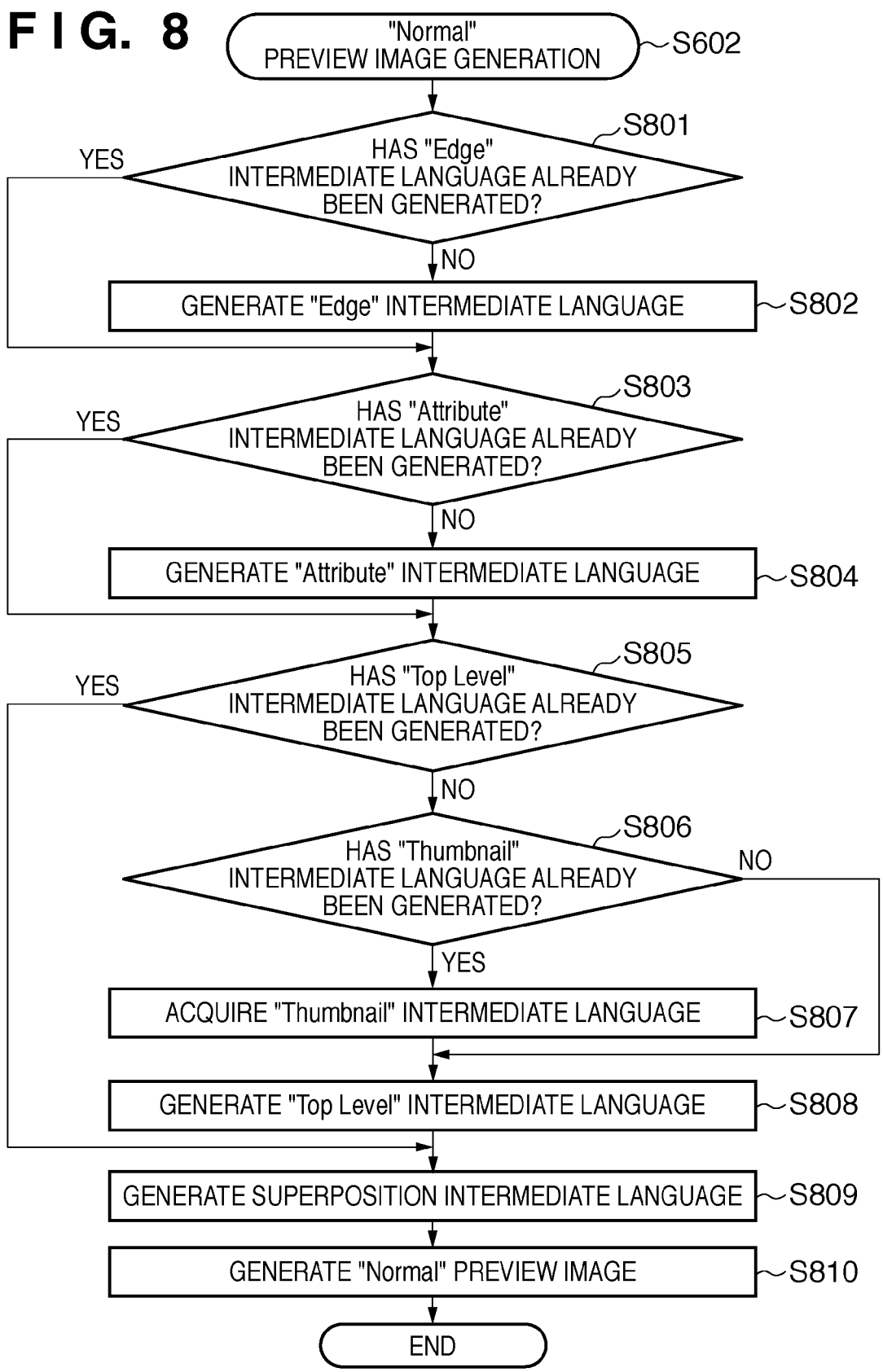
FIG. 8 is a flowchart showing a "Normal" preview image generation process according to the embodiment.

FIG. 8 is a flowchart showing the details of the normal preview image generation process in S602 of FIG. 6 according to the present embodiment. FIG. 13 illustrates details of the RAM 116 illustrated in FIG. 1. Intermediate languages as used herein refer to, for example, intermediate data that is necessary to generate preview images. Note that common methods are used as methods for generating intermediate data and methods for generating preview images, which will be described in the following procedure, the detailed description thereof will be omitted in the present embodiment.

The procedure described below includes a process of determining whether or not intermediate data has already been generated by former preview processing. This process is carried out by an intermediate-data reuse identification unit that determines whether or not intermediate data generated by former preview processing is reusable. This determination is made at every stage of intermediate data generation, because reusable intermediate data is different depending on the progress of preview processing.

In S801, it is determined whether or not an "Edge" preview intermediate language has already been generated. If any of the "Edge" preview method, the "Attribute" preview method, and the "Top Level" preview method has already been processed, an "Edge" preview intermediate language has already been generated and is thus reusable. One example configuration is that a reusable "Edge" preview intermediate language is stored in an "Edge" preview intermediate language area 1302 of an intermediate language storage area 1301 in the RAM 116. Then, it is determined whether or not data is stored in the "Edge" preview intermediate language area 1302, so as to determine whether or not there is reusable data. If there is a reusable "Edge" preview intermediate language, the processing proceeds to S803. If there is no reusable "Edge" preview intermediate language, the processing proceeds to S802 because a new "Edge" preview intermediate language needs to be generated. In S802, an intermediate language for generating the "Edge" preview image 701 is generated. The generated "Edge" preview intermediate language is stored in the "Edge" preview intermediate language area 1302 of the intermediate language storage area 1301 in the RAM 116.

In S803, it is determined whether or not an "Attribute" preview intermediate language has already been generated. If either the "Attribute" preview method or the "Top Level" preview method has already been performed, an "Attribute" preview intermediate language has already been generated and is thus reusable. One example configuration is that a reusable "Attribute" preview intermediate language is stored in an "Attribute" preview intermediate language area 1303 of the intermediate language storage area 1301 in the RAM 116. Then, it is determined whether or not data is stored in the "Attribute" preview intermediate language area 1303, so as to determine whether or not there is reusable data. If there is a reusable "Attribute" preview intermediate language, the processing proceeds to S805. If there is no reusable "Attribute" preview intermediate language, the processing proceeds to S804 because a new "Attribute" preview intermediate language needs to be generated. In S804, an intermediate language for generating the "Attribute" preview image 702 is generated. The generated "Attribute" preview intermediate language is stored in the "Attribute" preview intermediate language area 1303 of the intermediate language storage area 1301 in the RAM 116.

In S805, it is determined whether or not a "Top Level" preview intermediate language has already been generated. If the "Top Level" preview method has already been performed, a "Top Level" preview intermediate language has already been generated and is thus reusable. One example configuration is that a reusable "Top Level" preview intermediate language is stored in a "Top Level" preview intermediate language area 1304 of the intermediate language storage area 1301 in the RAM 116. Then, it is determined whether or not data is stored in the "Top Level" preview intermediate language area 1304, so as to determine whether or not there is reusable data. If there is a reusable "Top Level" preview intermediate language, the processing proceeds to S809. If the above-described preview processing has not yet been performed, the processing proceeds to S806.

In S806, it is determined whether or not a "Thumbnail" preview intermediate language has already been generated. However, as described previously, "Thumbnail" preview processing is conventionally unable to reuse already generated data because it is performed in a completely different procedure from that of original image generation processing since its outputs images differ from other preview images, for example. But only in cases of preliminary processes for the "Fill" process, the same processing is performed for both "Thumbnail" preview processing and other preview processing. Thus, while preview processing other than "Thumbnail" preview processing is sped up by reusing intermediate data transmitted between CPUs, "Thumbnail" preview processing is sped up by reusing inside information that has been generated in preliminary processes. One concrete example of preliminary processes for "Thumbnail" preview processing is a process of calculating address information that stores detailed "Fill" information, from "Fill" ID information during execution of the "Fill" process. For example, a configuration may be such that reusable address information (and detailed information about destinations indicated by the address information) is reused as inside information.

Another example configuration of preliminary processes is that inside matrix information calculated by scale-matrix conversions is reused as inside information. Assume, for example, that inside matrix information handled in CPUs is in a fixed-point format. In contrast, if matrix information handled as page images is in a different format such as a floating-point format, conversions are necessary. In such cases, if post-conversion inside matrix information is held in the CPUs, the information is reusable and redundant conversions are unnecessary. As described above, "Thumbnail" preview intermediate languages are conventionally not reusable since they are different from those used in serial preview processing. However, efficient processing becomes implementable by incorporating a mechanism for exceptionally handling and reusing inside information calculated in pre-stage common processing as a "Thumbnail" preview intermediate language. An example configuration is that such a reusable "Thumbnail" preview intermediate language is stored in a "Thumbnail" preview intermediate language area 1305 of the intermediate language storage area 1301 in the RAM 116. Then, it is determined whether or not data is stored in the "Thumbnail" preview intermediate language area 1305, so as to determine whether or not there is reusable data. If there is a reusable "Thumbnail" preview intermediate language, the processing proceeds to S807, in which a reusable "Thumbnail" preview intermediate language is acquired. After that, the processing proceeds to S808. If there is no reusable "Thumbnail" preview intermediate language in S806, the processing proceeds to S808.

In S808, an intermediate language for generating the "Top Level" preview image 703 is generated. If a "Thumbnail" preview intermediate language has already been acquired in S807, the data is used to generate an intermediate language for generating the "Top Level" preview image 703. After that, the processing proceeds to S809. In S809, a "superposition" intermediate language is generated. "Superposition" intermediate languages as used herein refer to intermediate languages that take processes of superimposing all objects into consideration, and correspond to intermediate languages for generating the "Normal" preview image 760. Thereafter, the processing proceeds to S810. In S810, the "superposition" intermediate language generated in S807 is used to generate the "Normal" preview image 760.

Through the above procedure, the "Normal" preview image generation process is performed. At the generation of a "Normal" preview implemented herein, it is checked in every preview method whether or not already generated intermediate languages are reusable. Then, a new intermediate language is generated using an intermediate language that is reusable and necessary for the next preview processing, or if no such an intermediate language exists, using the intermediate language. Note that processing referred to herein as next preview processing complies with the procedure of processing by the CPUs illustrated in FIG. 1.

"Edge" Preview Image Generation Process

Figure 9:
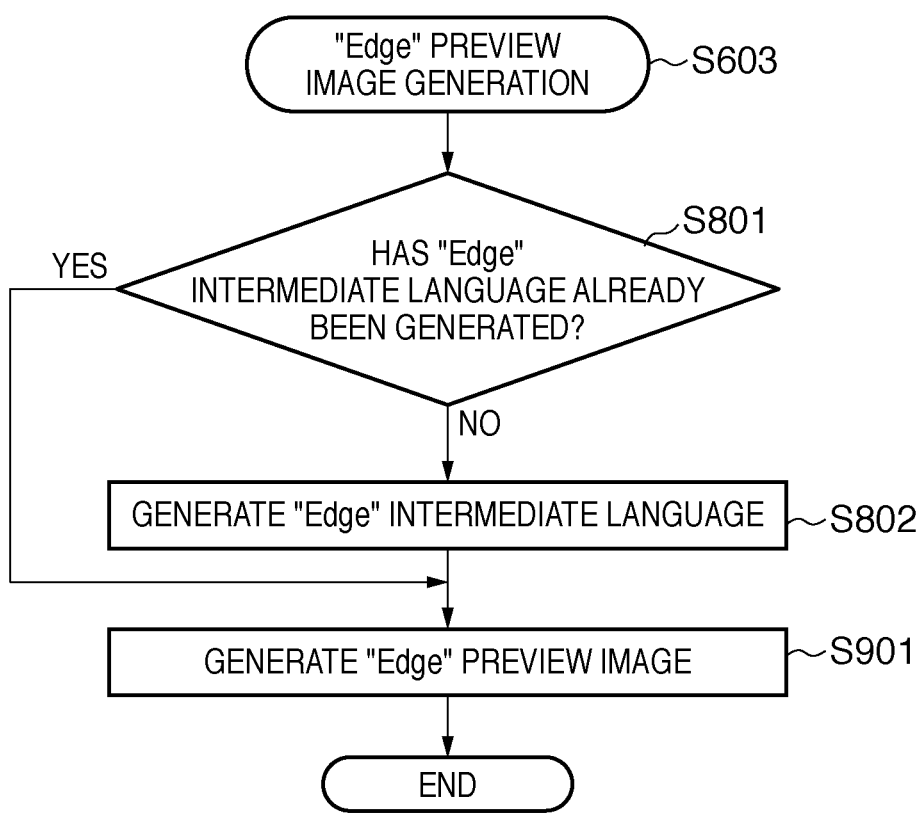
FIG. 9 is a flowchart showing an "Edge" preview image generation process according to the embodiment.

FIG. 9 is a flowchart showing the details of the "Edge" preview image generation process in S603 of FIG. 6 according to the present embodiment. The steps S801 and S802 are identical to those described above with reference to FIG. 8. In S901, the "Edge" preview image 701 is generated using the "Edge" intermediate language generated in S802.

"Attribute" Preview Image Generation Process

Figure 10:
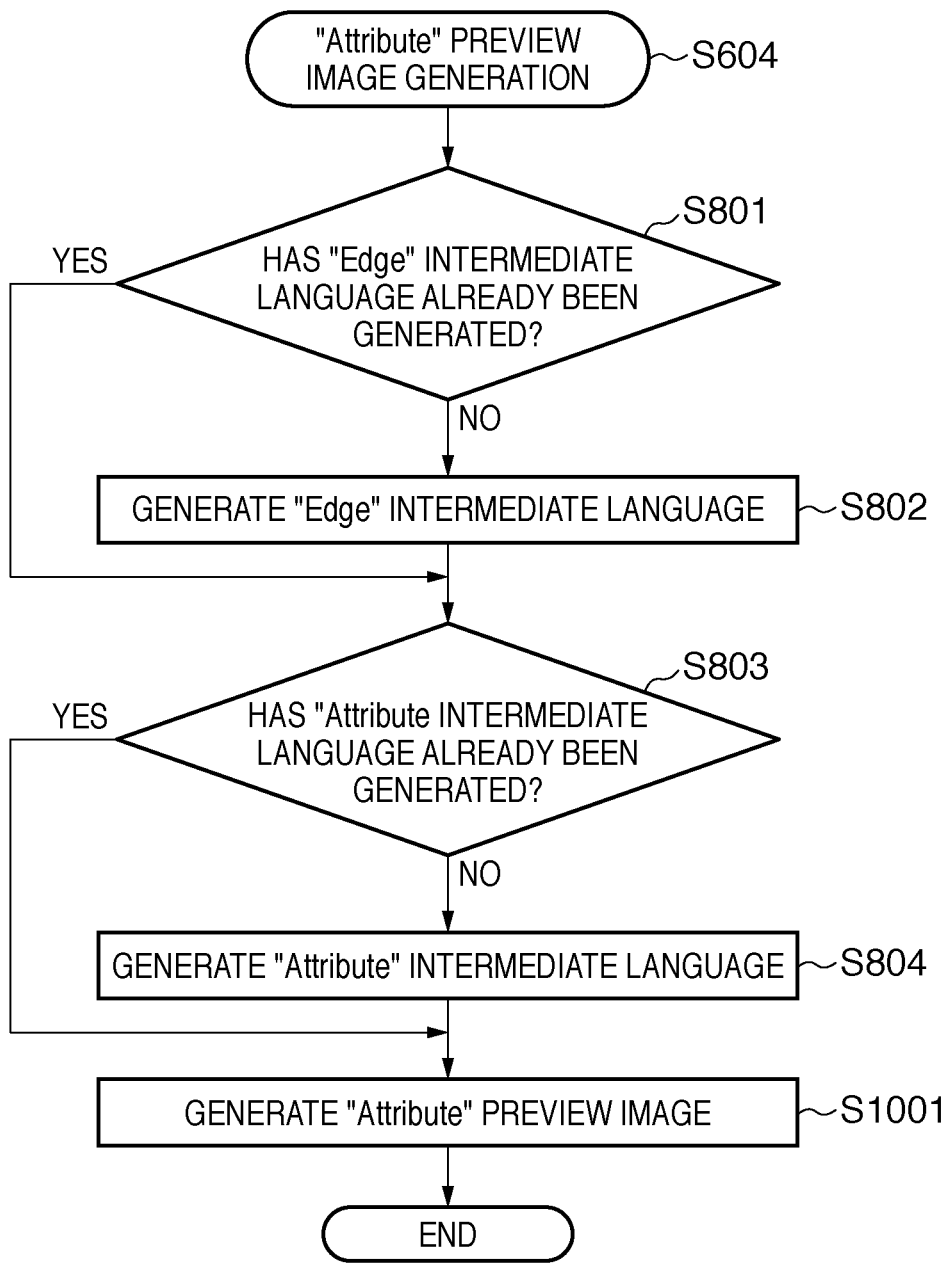
FIG. 10 is a flowchart showing an "Attribute" preview image generation process according to the embodiment.

FIG. 10 is a flowchart showing the details of the "Attribute" preview image generation process in S604 of FIG. 6 according to the present embodiment. The steps from S801 to S804 are identical to those described above with reference to FIG. 8. In S1001, the "Attribute" preview image 702 is generated using the "Attribute" intermediate language generated in S804.

"Top Level" Preview Image Generation Process

Figure 11:
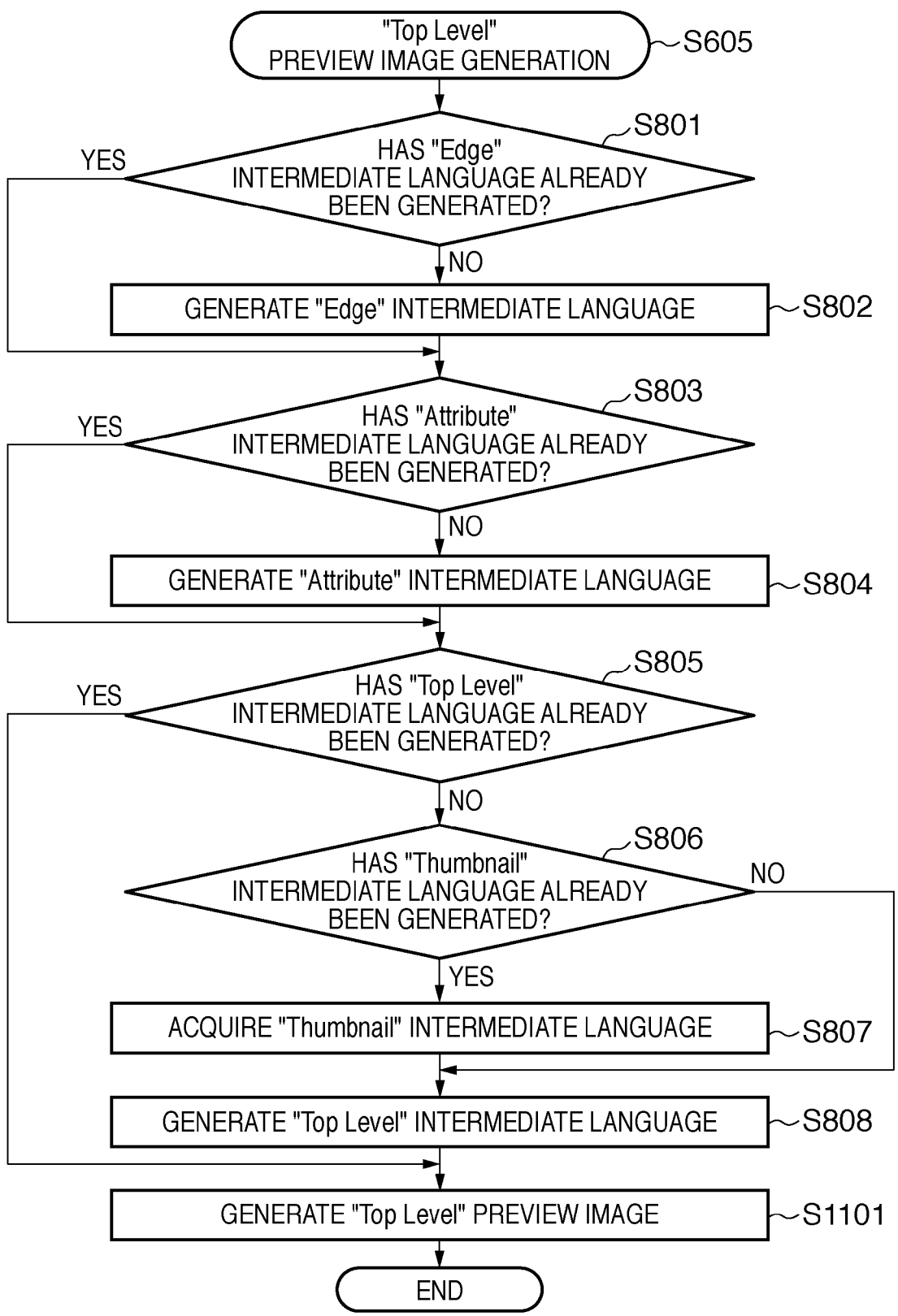
FIG. 11 is a flowchart showing a "Top Level" preview image generation process according to the embodiment.

FIG. 11 is a flowchart showing the details of the "Top Level" preview image generation process in S605 of FIG. 6 according to the present embodiment. The steps from S801 to S808 are identical to those described above with reference to FIG. 8. In S1101, the "Top Level" preview image 703 is generated using the "Top Level" intermediate language generated in S808.

"Thumbnail" Preview Image Generation Process

FIG. 12 is a flowchart showing the details of the "Thumbnail" preview image generation process in S606 of FIG. 6 according to the present embodiment. In S1201, color information about page data to be processed is acquired. The color information as acquired herein refers to, for example, color information about characters or graphics as indicated by 710, 720, and 740 in FIG. 7. In S1202, image information about page data is acquired. The image information as acquired herein refers to, for example, image information about images as indicated by 730 of 7a in FIG. 7. In S1203, the "Thumbnail" preview image 704 is generated based on the color information and the image information acquired in S1201 and S1202. In S1204, the color information and the image information acquired in S1201 and S1202 are stored as "Thumbnail" preview intermediate languages in the "Thumbnail" preview intermediate language area 1305.

Note that, as described above, while the present embodiment provides five examples of preview images (the "Edge" preview image, the "Attribute" preview image, the "Top Level" preview image, the "Thumbnail" preview image, and the "Normal" preview image), the present invention is not limited thereto. Thus, any combination of the flowcharts shown in FIGS. 8 to 12 is implementable, and any of them may be omitted.

Second Embodiment

Figure 14:
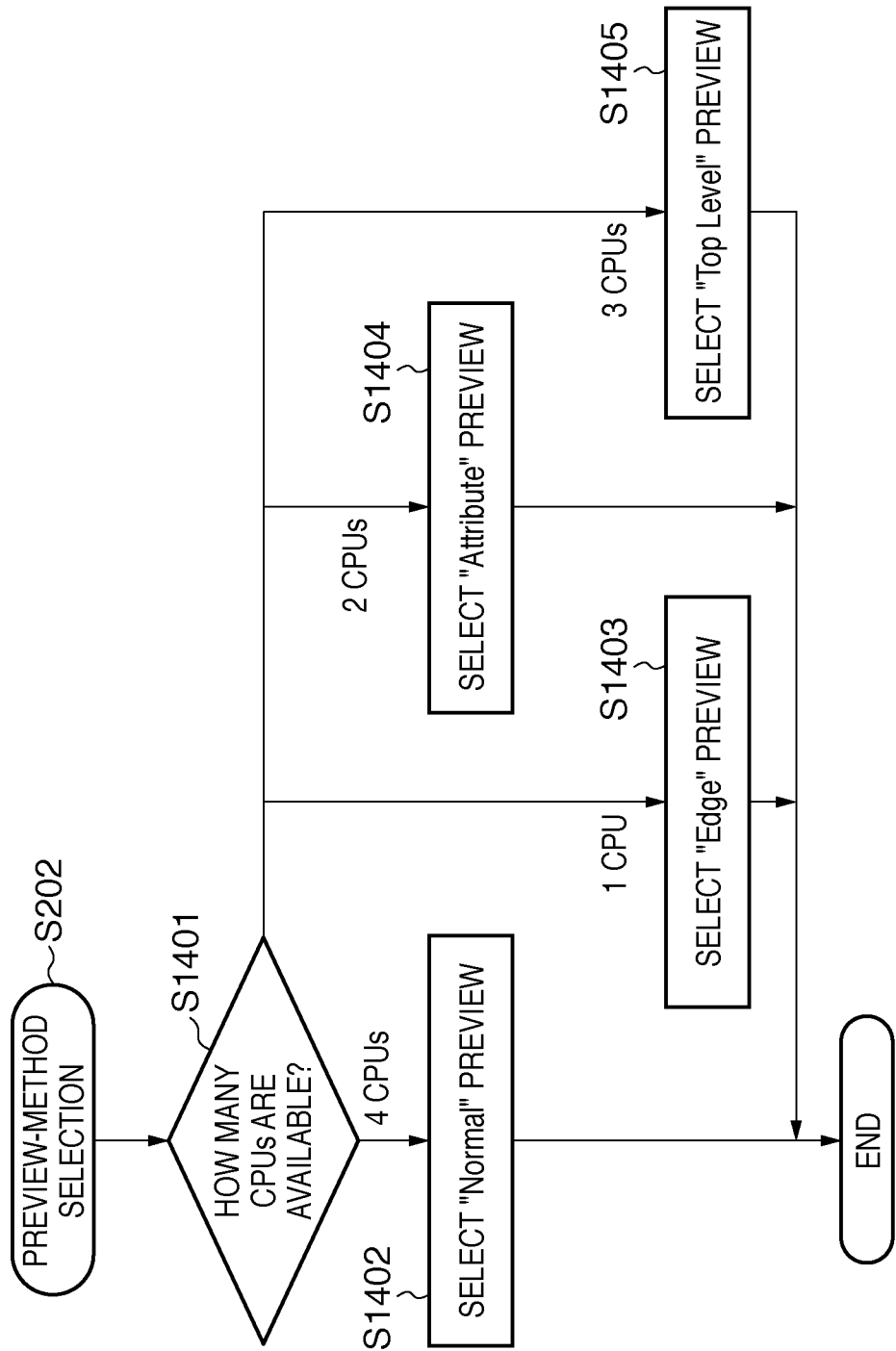
FIG. 14 is a flowchart showing a process of selecting a preview method according to a second embodiment.

FIG. 14 is a flowchart showing another embodiment of the preview-method selection process in S202 of FIG. 2 described in the first embodiment. In the first embodiment, availability of common resources is determined so as to select a preview method. In a second embodiment, a preview method is selected according to the number of available CPUs for preview processing as conflict information for selecting a preview method.

In S1401, the number of available CPUs is calculated from the conflict information 300. Based on the calculated number of available CPUs, processing relating to determination of the number of common resources for selecting an appropriate preview method is performed. If four CPUs are available, the "Edge" intermediate language generation process, the "Attribute" intermediate language generation process, the "Top Level" intermediate language generation process, and the superposition intermediate language generation process can be performed in parallel. Thus, the processing proceeds to S1402, in which the "Normal" preview process is selected. If one CPU is available, only the "Edge" intermediate language generation process can be performed at a time, so the processing proceeds to S1403, in which the "Edge" preview process is selected. If two CPUs are available, the "Edge" intermediate language generation process and the "Attribute" intermediate language generation process can be performed in parallel, so the processing proceeds to S1404, in which the "Attribute" preview process is selected. If three CPUs are available, the "Edge" intermediate language generation process, the "Attribute" intermediate language generation process, and the "Top Level" intermediate language generation process can be performed in parallel, so the processing proceeds to S1405, in which the "Top Level" preview process is selected. Through the above-described procedure, a preview method is selected according to the number of available CPUs.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-152874, filed Jun. 26, 2009, which is hereby incorporated by reference herein in its entirety.

What is claimed is:

1. A print processing apparatus for performing print processing, comprising:
   a plurality of processing units configured to perform a plurality of kinds of image processes to generate a preview image of print data;
   a use-situation identification unit configured to identify a use situation of the plurality of processing units, the use situation indicating whether or not each of the plurality of processing units is available to generate the preview image;
   a selection unit configured to select a preview method from among a plurality of preview methods for generating different preview images, according to a set of processing units that are available to generate the preview image or the number of processing units that are available to generate the preview image; and
   a display unit configured to display the preview image which is generated, using the selected preview method, based on the result of the image process by the available processing unit;
   wherein the plurality of preview methods include the following:
      a preview method for displaying an outline of an object to be drawn in the print data;
      a preview method for displaying the object to be drawn in different colors according to attribute information;
      a preview method for superimposing and displaying the object to be drawn in an order specified by the print data; and
      a preview method for providing a thumbnail display that includes color information and image data.

2. The print processing apparatus according to claim 1, further comprising:
   a determination unit configured to determine the number of available processing units from among the plurality of processing units, based on the use situation identified by the use-situation identification unit,
   wherein the selection unit is configured to select one of the plurality of preview methods according to the number of available processing units determined by the determination unit.

3. The print processing apparatus according to claim 1, wherein
   the use-situation identification unit is configured to detect a change in the use situation of the processing units,
   the selection unit is configured to reselect a preview method according to the change in the use situation detected by the use-situation identification unit, and
   if intermediate data for generating the preview image is already generated, the intermediate data is used in the reselected preview method, and
   if the intermediate data is not generated, the image process which is used in the reselected preview method to generate the intermediate data is performed by the processing unit that is available in the change in the use situation.

4. The print processing apparatus according to claim 3, further comprising:
   a reuse identification unit configured to identify whether or not the intermediate data already generated is reusable to generate the preview image,
   wherein the intermediate data that has been identified as being reusable by the reuse identification unit is used in the reselected preview method.

5. The print processing apparatus according to claim 1, wherein the selection unit assigns the image process used in the selected preview method to the available processing unit.

6. The print processing apparatus according to claim 1, wherein the selection unit loads a program corresponding to the image process used in the selected preview method into the available processing unit.

7. The print processing apparatus according to claim 1, further comprising:
   a storage unit configured to store preview information that associates a plurality of use situations of the plurality of processing units with the preview methods,
   wherein the selection unit selects one of the preview methods that is associated with the identified use situation of the plurality of processing units.

8. A control method for a print processing apparatus that performs print processing and comprises a plurality of processing units that are configured to perform a plurality of kinds of image processes to generate a preview image of print data, the method comprising:
- a use-situation identification step of identifying a use situation of the plurality of processing units, the use situation indicating whether or not each of the plurality of processing units is available to generate the preview image;
- a selection step of selecting a preview method from among a plurality of preview methods for generating different preview images, according to a set of processing units that are available to generate the preview image or the number of processing units that are available to generate the preview image; and
- a display step of displaying the preview image which is generated, using the selected preview method, based on the result of the image process by the available processing unit;
- wherein the plurality of preview methods include the following:
  - a preview method for displaying an outline of an object to be drawn in the print data;
  - a preview method for displaying the object to be drawn in different colors according to attribute information;
  - a preview method for superimposing and displaying the object to be drawn in an order specified by the print data; and
  - a preview method for providing a thumbnail display that includes color information and image data.

9. An image processing apparatus for performing a preview process to generate a preview image and another process different from the preview process, the image processing apparatus having at least one resource which is usable for the preview process and the other process, comprising:
- a determination unit configured to determine whether the at least one resource is used for the other process which is different from the preview process; and
- a selection unit configured to select a preview method from among at least first and second preview methods for generating different preview images, according to the determination by the determination unit,
- the first preview method using a kind of image process to generate the preview image,
- the second preview method not using the kind of image process,
- wherein the selection unit is configured to select the first preview method if the at least one resource is available for the kind of image process based on the determination by the determination unit and to select the second preview method if the at least one resource is not available for the kind of image process based on the determination by the determination unit;
- wherein the first and second preview methods include the following:
  - a preview method for displaying an outline of an object to be drawn in the print data;
  - a preview method for displaying the object to be drawn in different colors according to attribute information;
  - a preview method for superimposing and displaying the object to be drawn in an order specified by the print data; and
  - a preview method for providing a thumbnail display that includes color information and image data.

10. The image processing apparatus according to claim 9, wherein the selection unit loads a program corresponding to the kind of image process used in the selected first preview method into the at least one resource.

11. The image processing apparatus according to claim 9, wherein the selection unit reselects the first preview method from among the first and second preview methods if the at least one resource, that has been determined that the at least one resource is not available for the kind of image process, becomes available for the kind of image process.

12. The image processing apparatus according to claim 9, wherein
- the image processing apparatus has first and second resources,
- the first and second resources are usable for the preview process and the other process,
- the determination unit determines whether each of the first and second resources is used for the other process,
- the first preview method uses first and second kinds of image process to generate the preview image,
- the second preview method uses the first kind of image process and does not use the second kind of image process,
- the selection unit selects the first preview method if the first and second resources are available for the first and second kinds of image process, and
- the selection unit selects the second preview method if the first resource is available for the first kind of image process and the second resource is not available for the second kind of image process.

* * * * *